United States Patent [19]

Woo, Jr. et al.

[11] 4,158,229
[45] Jun. 12, 1979

[54] ELECTRONIC RULE FOR PRECISE DISTANCE MEASUREMENT AND DISTANCE SETTING

[76] Inventors: John Woo, Jr., 112 Teakwood Dr., Huntsville, Ala. 35801; Yeong-Chung E. Lien, 3036 Yellowstone Dr., Lawrence, Kans. 66044

[21] Appl. No.: 809,772

[22] Filed: Jun. 24, 1977

[51] Int. Cl.² .................. G01C 3/00; G01B 11/02
[52] U.S. Cl. .......................... 364/562; 33/125 A; 33/1 L; 356/396
[58] Field of Search ............ 364/561, 562; 33/125 A, 33/1 L, DIG. 3; 250/202; 356/156, 170

[56] References Cited

U.S. PATENT DOCUMENTS

| | | | |
|---|---|---|---|
| 3,594,783 | 7/1971 | Bullock | 364/561 X |
| 3,765,764 | 10/1973 | Niss | 356/156 |
| 3,872,288 | 3/1975 | Sampey | 364/561 |
| 3,955,073 | 5/1976 | Carew et al. | 364/561 |
| 3,965,340 | 6/1976 | Renner et al. | 235/151.32 |

*Primary Examiner*—Edward J. Wise
*Attorney, Agent, or Firm*—Schwartz, Jeffery, Schwaab, Mack, Blumenthal & Koch

[57] ABSTRACT

An instrument for precise measurement and setting of distances has an electronically controlled scale comprising optically active elements, an electronically controlled digital display, and a keyboard. The display and keyboard are mechanically rotatable and connected by electronic circuitry including a microprocessor. The light scale provides optical indicia, including a reference point and a cursor, having positions which are determined by keyboard entries and are displayed numerically.

28 Claims, 6 Drawing Figures

ELECTRONIC RULE FOR PRECISE DISTANCE MEASUREMENT AND DISTANCE SETTING

BACKGROUND OF THE INVENTION

1. Field of the Invention

The invention relates to distance measurement and determination devices, and more particularly to electronically controlled digital display of distances determined with the aid of an optically active scale under the control of keyboard instructions.

2. Description of the Prior Art

As is well known to those versed in the art of performing measurements of lengths and distances ranging from the order of tenths of millimeters to several feet, a great variety of instruments with various degrees of precision is available. In the order of increasing precision, there are the meter stick or foot ruler, the vernier caliper, the micrometer, and acoustical and electromagnetic wave devices using the principle of wave reflection or used as interferometers. For ordinary measurements of lengths to a precision of tenths of centimeters, the meter stick is used. Although this is the classical and time-honored method of measurement, it is not entirely satisfactory. The user must overcome errors associated with parallax and interpolation between scale divisions. Furthermore, the scale markings are fixed and conversion to other systems of units must be done as a separate operation, introducing additional errors. Previous devices competing with the meter stick have used mechanical switching of electrical current in an electrical resistor to perform measurements of length.

Gallacher et al U.S. Pat. No. 3,973,326 is illustrative of such a prior art device, having a cursor on a movable wand and a resistor extending along the length of the wand. An electrical contact on the cursor contacts the resistor, thereby forming a potentiometer with an output which is variable with cursor position. A digital voltmeter provides an indication of the distance measured. Such devices are cumbersome to use and the mechanical switching mechanisms cause reliability problems. Moreover, prior devices for performing ordinary measurements of length have not been directly coupled to electronic calculating devices so as to provide convenience and the greater power of electronic arithmetic.

The use of light sensing elements, particularly fiber optics, to determine distances in conjunction with counters and stored program computers is disclosed in Rempert U.S. Pat. No. 3,598,978. However, relative movement is required between the object and the light sensing element, and the device does not operate as a replacement for a ruler or meter stick having a scale thereon. Scales are utilized in Zipin U.S. Pat. No. 3,748,043, but only for viewing by photosensors to determine a more accurate measurement by interpolation. A display is provided for the determined distance which is, however, not under operator control with respect to either scale factor or other functions.

Other devices are known for distance measurement by optical means as illustrated by Renner et al U.S. Pat. No. 3,965,340 and Kimura U.S. Pat. No. 3,784,833. Such devices require the use of gratings to effect light measurement. Renner et al, for example, detects a change in light transmission due to a relative displacement between a fixed interference grating (on a fixed caliper) and a movable grating (on a movable caliper). The changed light transmission is detected to provide an indication thereof on an associated calculator. Kimura requires a diffraction grating to effect light measurement utilizing LED's and photodetectors by affixing the detectors directly to the rear of an index grating. Such devices rely on complicated optical instrumentation and do not provide for ordinary scale measurements of distances of either commonplace or arbitrary scale factors.

Lewis U.S. Pat. No. 3,515,888 uses a reticle assembly to determine position change with respect to a fixed reference by using optical gratings for chopping a light beam. Niss U.S. Pat. No. 3,765,764 uses light deflecting means for coordinate measurements. A source projects light onto a movable deflecting means, thence to a further measuring point. Grendelmeier U.S. Pat. No. 3,599,004 determines scale placement utilizing equispaced photocells. A differential amplifier is used to permit measurement of displacements less than the cell size. Such devices, while utilizing light sensing means do not provide a portable means, under operator control, for obtaining distance measurement comparable to ordinary meter-stick manual measurement, nor do the devices provide for variation of a scale factor under operator control. Moreover, the prior art devices do not contemplate the use of an optically active scale for distance setting and measurement.

SUMMARY OF THE INVENTION

The present invention overcomes the disadvantages of the prior art and provides distance measurement and setting utilizing an optically active scale. In accordance with the invention, a high resolution distance measurement device is provided for measurement in the British system, the Metric system, or in any other user-defined system of measurement. The apparatus disclosed herein provides a digital numeric display of the measurement to the user, as well as displaying a length when the numeric distance and basic measurement unit are provided as inputs to the devices.

A series of optically active elements is spaced along a line in close proximity to the straightedge of the device to serve as a scale. A keyboard permits the user to input numbers and to control the operations and functions performed by the subject device, with a digital numeric display conveying the value of a distance setting, or the results of a length measurement, to the user.

Accordingly, it is a principal object of the invention to provide a distance measuring apparatus utilizing an optically active scale.

It is another object to provide a distance setting means having an optically active scale for use with arbitrary scale factors.

Yet another object is to provide computer activated distance measurement devices of a portable nature.

It is a further object to provide digital display for a distance measurement device activated by computer control.

It is still a further object to provide stored program control for a distance measurement device utilizing optically active scales.

Another object is to provide multiplex control signals for a computer controlled measurement device, whereby keyboard scanning, display and scale illumination signals are multiplexed.

Yet another object is to present a highly reliable length measuring device having high resolution, thereby eliminating the need for interpolation.

BRIEF DESCRIPTION OF THE DRAWINGS

The foregoing objects, features and advantages of the present invention will be made clear, along with other advantages, features and objects thereof, by reading the specification along with the drawings wherein like numbers designate like objects throughout.

DETAILED DESCRIPTION OF THE PREFERRED EMBODIMENT

Figure 1:
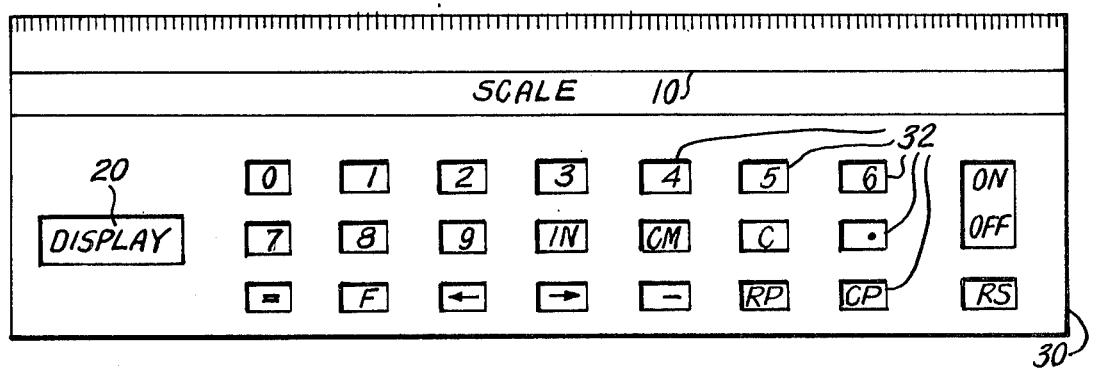
FIG. 1 shows an apparatus embodying the present invention.

FIG. 1 illustrates a preferred embodiment of the electronic rule. Three major elements of the device are shown: an optically active LED scale 10, a digital numeric display 20, and a keyboard 30. The keyboard comprises a plurality of keys 32, including keys for numerical entry and function keys.

The electronic rule disclosed herein can be used to perform length measurement or distance setting. In performing a measurement of distance or length, a linear distance between the left and right endpoints of an object is determined. In distance setting, the user specifies a measurement unit and a numerical value, d. The electronic rule will then select two points so that the distance between them is d. These operations are defined and further described in conjunction with FIG. 6, infra.

Figure 2:
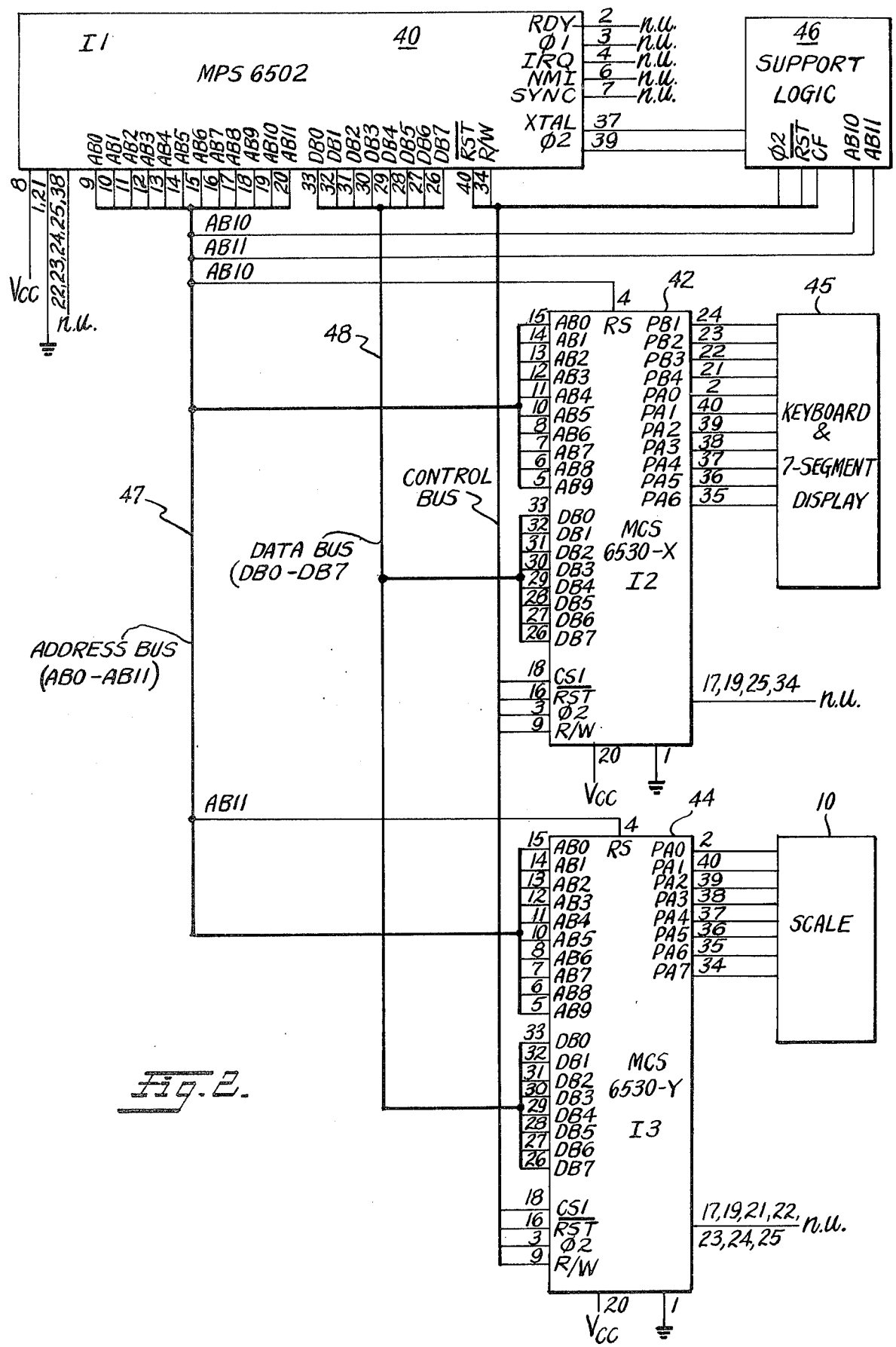
FIG. 2 illustrates the internal components of the presently preferred embodiment and the electrical interconnections therebetween.

Turning now to FIG. 2, the various components utilized in the preferred embodiment, and the interconnection thereof, are shown as including a microprocessor chip 40, such as is available from MOS Technology, Inc. of Norristown, Pa. under the nomenclature MPS 6502 and two peripheral interface/memory units of large scale integraton (LSI chips available from MOS Technology as chips MCS 6530) shown at 42 and 44. Each LSI unit includes two input/output registers, two peripheral data buffers, an interval timer, two data control registers, an address decoder, a data bus buffer, a chip select unit and two memory units, a mask programmable 1024×8 ROM and a 64×8 static RAM.

These units as well as the microprocessor unit are described in Appendices G and H in MOS Technology "K1M-1 User Manual".

Figure 5:
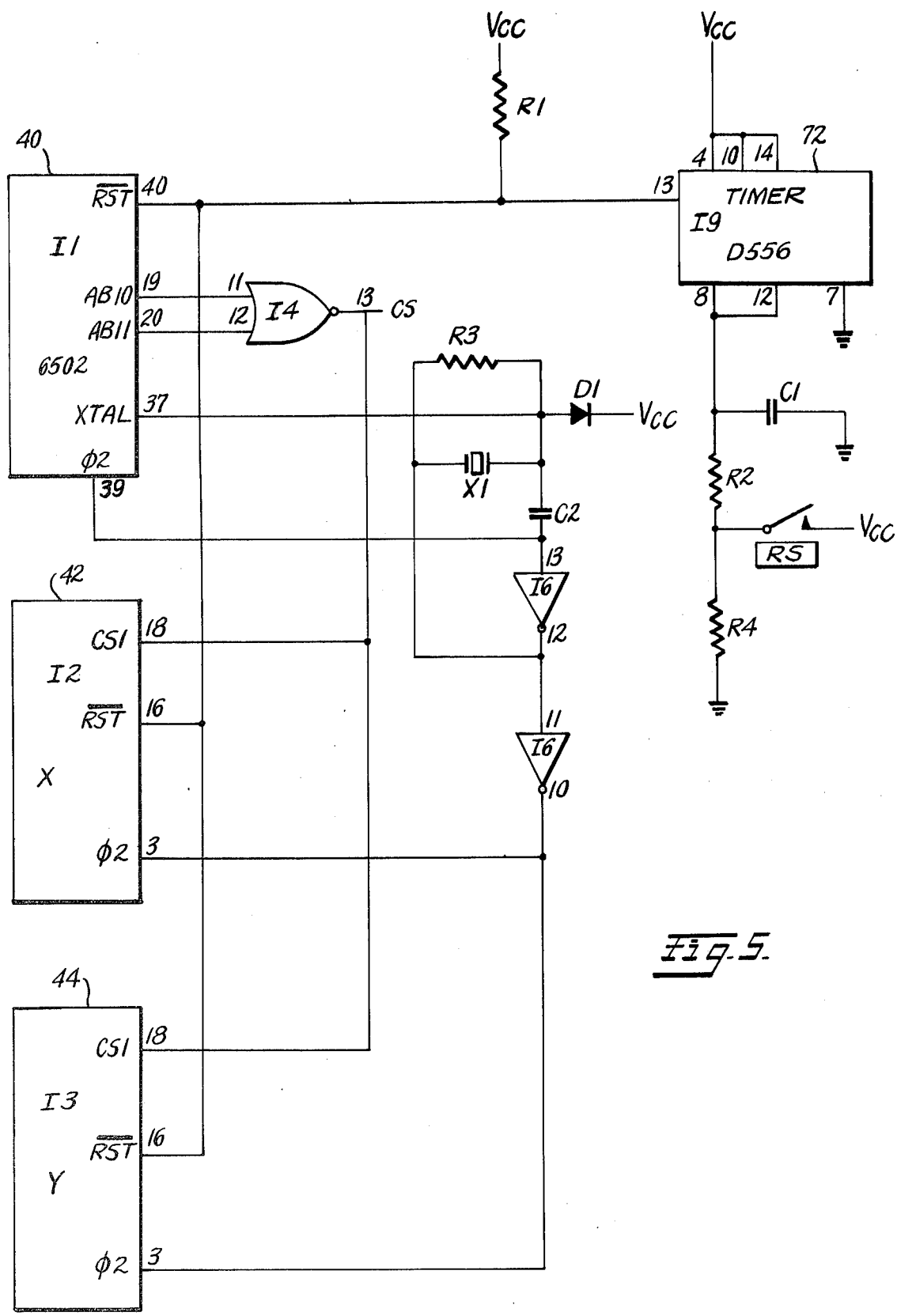
FIG. 5 shows a circuit diagram of supporting logic used within the invention.

Support logic unit 46, shown more fully in FIG. 5, is connected to the microprocessor and LSI units. Unit 42 interfaces with both keyboard 30 and a seven segment display 20, shown combined in block 45. Unit 44 is used to interface with scale 10.

A bus structure is utilized for communicating between the various units as follows. An address bus 47, having lines AB0-AB11 therein, communicates between microprocessor 40 and units 42 and 44. Additionally, lines AB10 and AB11 therein communicate with support logic 46. A data bus 48, containing lines DB0-DB7 therein, further provides communication between the microprocessor and the two LSI units. Peripheral pins PA0-PA6 and PB1-PB4 of unit 42 communicate with and drive the keyboard and seven segment display of the invention, and peripheral pins PA0-PA7 of unit 44 control the various elements of the optically active scale 10.

Each peripheral pin may be used either as an input or an output pin, the specific use being determined by the content of a corresponding bit in an I/O direction register contained within the unit, the register contents being under the control of an operating program, which also controls microprocessor 40, the system's central processing unit.

Central-Processing-Unit 40 is capable of performing simple arithmetic logic operations, such as add, subtract, logical AND, OR, EXCLUSIVE OR, NOT, and shifting. Control instructions such as jump, jump to subroutine, return from subroutine, and conditional jumps are also available. The microprocessor uses a stack to store return addresses for subroutine calls. The stack is located in the RAM of MCS 6530 chips 42 and 44.

The previously mentioned operating program is used to support functions of the Electronic Rule and is stored in the ROM portion of the two MCS 6530's. The program can be activated by an RST (reset) interrupt to the MPS 6502. When the RST interrupt occurs, (when the user of the electronic rule pushes the $\boxed{\text{RS}}$ key), the microprocessor fetches from a fixed location in the operating program an address, which points to the beginning of the operating program. The address is loaded into the program counter and execution of the operating program begins.

As previously mentioned, each of the two MCS 6530 chips contains 64 bytes of RAM, 1K bytes of ROM and 64 locations for input-output ports and timers. The RAM portion is used to store variable data such as user-defined measuring units, digits to be displayed, locations of the reference point (RP) and cursor (X), etc. The RAM is also used by the microprocessor as the system stack.

Each I/O port in a MCS 6530 chip is associated with an I/O data register and an I/O direction register. Both registers can be accessed by providing a unique address, which is part of the entire memory address space. That is, the I/O ports are treated like memory storage locations.

Figure 3:
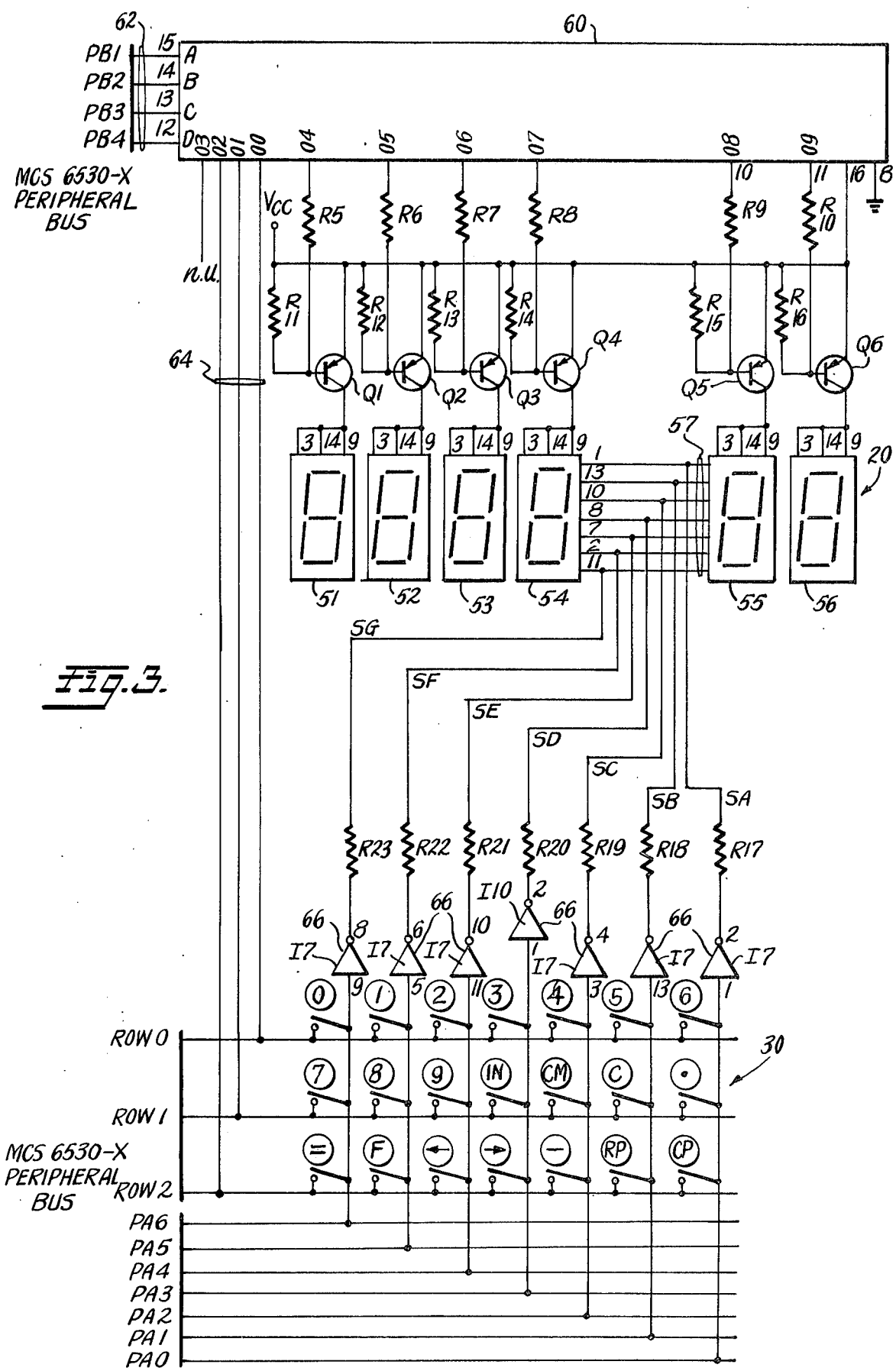
FIG. 3 shows the electrical connections for the keyboard and display of the invention.

Referring now to FIG. 3, the keyboard 30 and display 20 are shown in greater detail. Specifically, seven-segment display units 51-56 are shown, each being driven by lines 57. A specific display element is chosen for activation by one of transistors Q1-Q6, activated and deactivated by signals output by decoder 60. Decoder 60 comprises a BCD to decimal decoder such as commonly available under the designation SN 74145 from Texas Instruments. The input lines 62 to decoder 60 are connected to the peripheral bus for connection to pins PB1-PB4 of unit 42.

Additional output lines 64 from decoder 60 are connected to the three rows of the keyboard in the presently preferred embodiment. Pins PA0-PA6 of unit 42 are connected to the columns of the keyboard and also, through open collector inverters 66, to display units 51-56.

Under control of the operating program, display 20 is activated by scanning the several display elements. The scan is achieved by the proper coding of pins PB1-PB4, resulting in sequential selection of transistors Q1-Q6 by the action of decoder 60. For each selected transistor, and correspondingly selected display element, the number to be displayed is obtained from a table in unit 42 and converted to a code suitable for seven segment display which is placed in a register. Pins PA0–PA6, caused by the program to act as output pins, convey the proper seven-segment code to the display element. The operating program also selects the proper scale elements to display RP and X. After performing its display function, the operating program causes keyboard 30 to be scanned.

Keyboard scanning is achieved by providing sequentially the codes for activating output lines 00–02 of decoder 60. The codes are applied sequentially by pins PB1–PB4 of unit 42. For each code, one of lines 00–02 is chosen, and one of rows 0–2 of keyboard 30 is activated. During each such activation, pins PA0–PA6, now caused to act as input pins, are sequentially selected, thus scanning each key in the selected row of the keyboard. If a key depression is detected, the operating program executes the function represented thereby. If not, the next row is scanned. After execution of the function (or determining that no key was depressed), the program again energizes the display and scale.

The functioning of the main operating program is more clearly shown in Appendix A, which includes a flow chart representation thereof. The various subroutines are shown in Appendix B. As is apparent from the preceeding description, the inventive device thus includes a means for multiplexing the display and keyboard sensing, thereby providing for the use of fewer pins, lines, connections, and other hardware. In view of the high operating speeds available in digital computers, such multiplexing does not adversely affect the user's perception of the display and scale. Specifically, objectionable flicker and other disadvantages do not result from the approach used herein.

Figure 4:
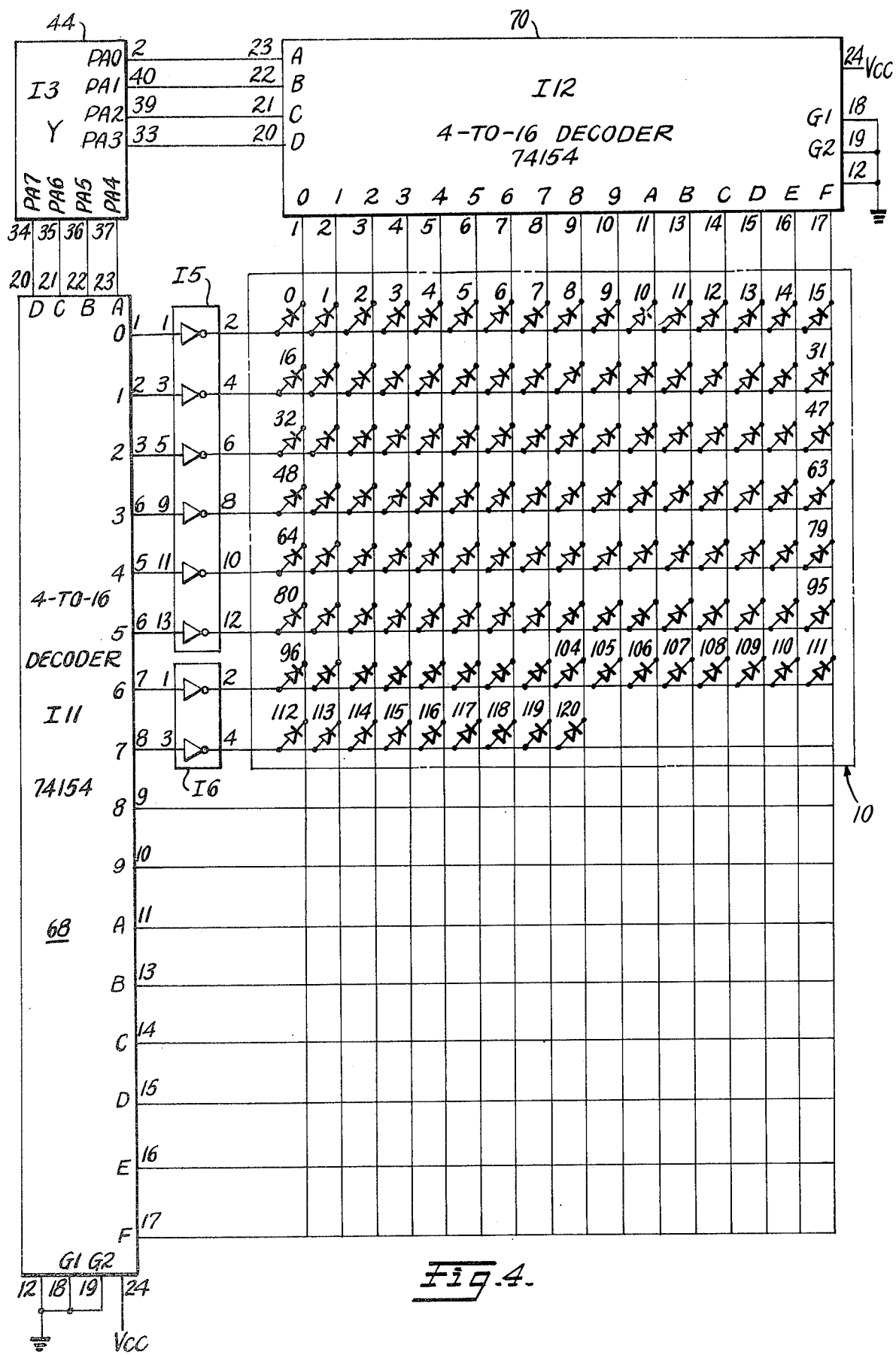
FIG. 4 shows the electrical connections to the scale of the invention.

Referring now to FIG. 4, scale 10 is shown comprising a plurality of active optical elements disposed at intersections of addressing lines for the elements emanating from decoders 68 and 70. The decoders are available, for example, under the label SN 74154 from Texas Instruments, and comprise four-to-sixteen decoders. A particular optical element is activated by selecting the specific row and column output lines at whose intersection the element sits. The presently preferred embodiment contemplates the use of light emitting diodes as the scale elements, but it is recognized that any elements which affect the absorbance, reflectivity, or emission of visible light may be used. Thus, while it is known to use optically passive scales for conventional measurement, including scales which are inscribed for absorbing or reflecting light with greater intensity than the medium in which the scale is embedded, the present invention utilized optically active scales. It is contemplated that any scale comprising electronic components which can emit visible light or absorb visible light from another light source under the control of the user may be used. More particularly, the optically active scales contemplated herein include any scale having components wherein one or more of the following properties of light are controlled whether by electrical, electromagnetic, thermal or magnetic fields: emission, absorption, reflection and transmission, for example. Such elements include light emitting diodes, as presently selected for use in the scale, liquid crystal elements, etc.

The specific elements of the scale are selected by LSI unit 44 providing output signals on peripheral lines PA0–PA7 to decoders 68 and 70. While the presently preferred embodiment contemplates the use of 121 elements in scale 10, it is clear that with no modification of hardware design the eight output lines from LSI unit 44 in conjunction with decoders 68 and 70 may equally address 256 components of a scale. Similarly, with slight modification, such as increasing the storage available to unit 44, and with the use of different decoders 68 and 70, virtually any number of elements may be incorporated within the scale. In the presently preferred embodiment, two elements are activated to display two points. Conceivably, scale displays of more than two elements, or of variable numbers of elements or of a fixed number of variable elements may be desired. For any of these possibilities the elements to be activated may be selected either by scanning and multiplexing elements along a row, or by simultaneous activation of all selected elements. The preferred embodiment provides multiplexed activation of the LED's selected to represent RP and X.

Turning now to FIG. 5, the supporting logic shown in FIG. 2 is illustrated as comprising a timer 72 connected to CPU 40 as well as to LSI units 42 and 44. Additionally, a crystal circuit is utilized in the timing connections, thereby providing a separate phase for the logic circuitry.

In operation, the use of an optically active scale permits, inter alia, provision of a standout optical contrast for the endpoint optical elements in comparison with the interval being measured. That is, while the two LED's at the endpoints of a line interval being measured are activated, remaining diodes are not and the endpoints only are made conspicuous, thereby decreasing the chance for measurement error. The system may similarly operate by activating the optical elements along the entire interval, or by activating all elements except those along the interval being measured, rather than only the endpoint elements. Either of these alternatives also provides enhanced contrast and reduction in measurement error. In performing a measurement, three phases of operator-machine interaction are contemplated. The following discussion may best be understood with reference to FIG. 6 where circles correspond to operations by the user and rectangles to values of registers internal to the apparatus.

In a first phase, a reference point is selected. As discussed above, only two scale positions are activated. The two positions may coincide. One position is called the reference point (hereinafter RP), and the other is called the cursor (or X). When the power is turned on, RP is automatically set to the left margin of the LED scale and the cursor position will be the same as RP. When the buttons ⬚←⬚ and ⬚→⬚ are depressed, the cursor position will be changed. The new cursor position depends on the previous cursor position, the button depressed, and the length of time a button remains depressed. The cursor position will propagate to the right (or left) as long as ⬚→⬚, (or ⬚←⬚) is depressed. When the user positions the cursor adjacent to one endpoint A of the object to be measured, ⬚RP⬚ may be depressed to indicate that this position has been selected as the new RP. The light for the old RP will be turned off and, until the next time RP is changed, any later measurement will be relative to this point. That is, a distance to the left of RP will be displayed as a negative number on the digital numerical display and a distance to the right as positive. The convention can be reversed by depressing ⬚F⬚ (flip sign) key. When ⬚F⬚ is depressed twice, the default convention will be used. It is noted that the user can also choose to physically translate the whole rule so that any lighted LED can serve as the RP.

Having determined a new RP, the cursor is moved to a second endpoint of the object to be measured and the distance between RP and cursor displayed. It is possible, however, that different measurement units might be desired by the user. Accordingly, a second phase is provided wherein the specific unit to be used is determined. When entering the second phase, the cursor position coincides with RP. If the user selects a conventional distance unit such as inches (or centimeters), he can depress [IN], (or [CM]), which will move the cursor position to the right by one inch (or one centimeter). The display will have a value 1. If the units are arbitrary then the calibration point CP must be defined. The user then depresses [←] or [→] to move the cursor position, similar to the steps in the first phase, until it is adjacent to the calibration distance. He further depresses [CP] and enters the numerical value C of the calibration distance by depressing the digits in sequence. It is noted that C may be negative. The value of C will be displayed. The user then depresses [=] to indicate that the calibration distance is to be taken as C units. At this time, the calibration phase is complete and the display shows the distance C between the RP and the cursor position.

The third phase is the measurement phase. When the user positions the cursor adjacent to the other endpoint B of the object, the distance between A and B will be converted to proper units and displayed. The orientation of the vector from A to B will also be displayed with a negative number to mean left-going and a positive number to means right-going unless a reverse orientation has been selected by depressing [F].

The distance setting process can also be described as a 3-phase procedure with the first two phases identical to those of the length measuring process. During the third phase, the user enters a number, j, which may be negative, by pressing the digits of j in sequence folled by [=]. The number j will be displayed and the electronic rule will move the cursor (in the direction depending on the sign of j) to a position such that the distance between RP and the cursor position, in the units specified by the user, is j.

Figure 6:
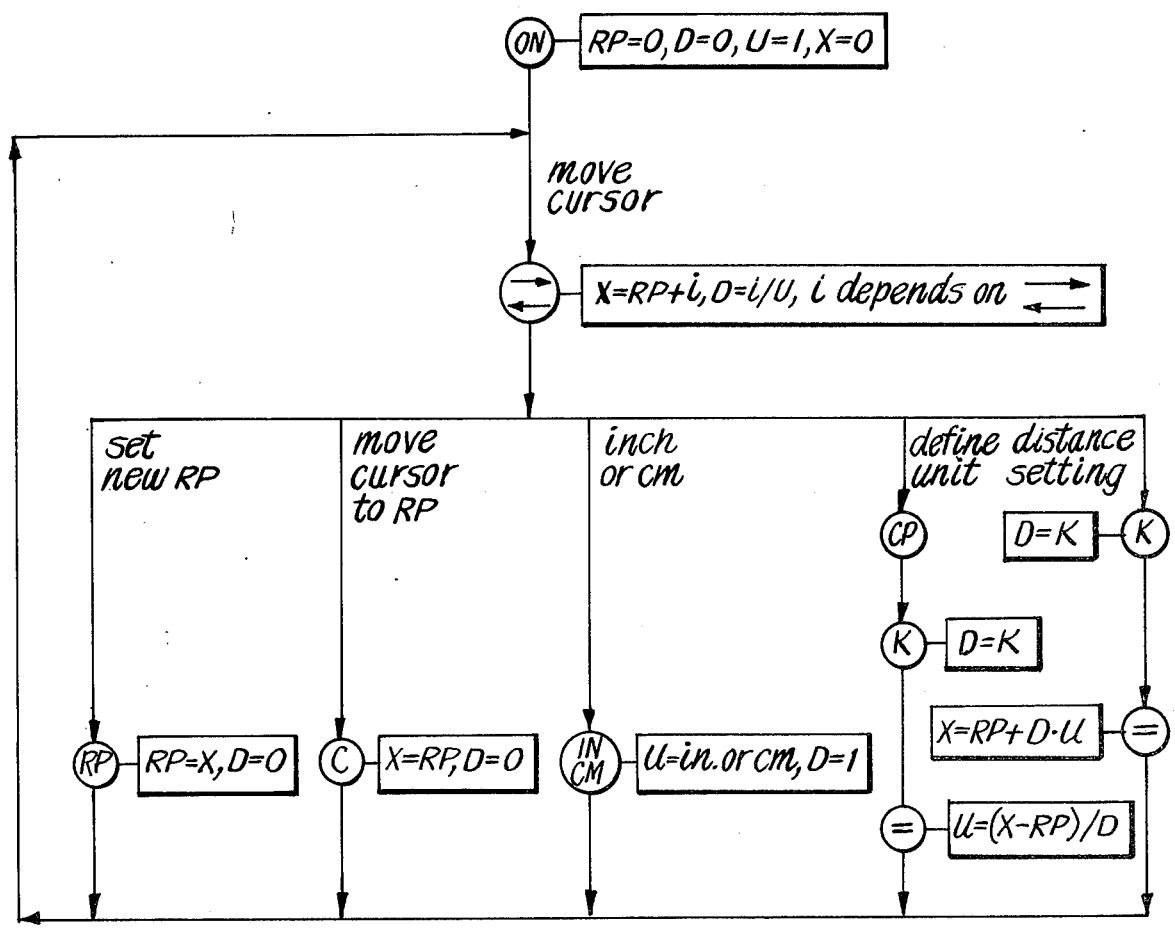
FIG. 6 is a flow chart illustrating the interaction between the operator and the inventive apparatus.

In both the length measuring and the distance setting processes RP is defaulted to the leftmost end of the rule if the user chooses not to set his own RP position. The measurement unit is defaulted to the distance between two neighboring LED lights if the user does not specify his own. In FIG. 6, the control sequences described above are summarized as a flow chart. At each circle the specific user operation represented by the circle will cause the actions described in the associated rectangle. Each circled operation represents pressing of the similarly labeled button by the user on the keyboard. The registers represented by the rectangles include:

RP—position of the reference point
X—position of cursor
D—number displayed
U—the unit conversion factor in terms of number of LED's
IN,CM—constant unit conversion factor for inch or centimeter.

Any sequence of operations not included in the flow chart will be considered illegal. The display will blink all the seven segment lights when an illegal operation is detected. The user can press [C] to clear the display. In this case, RP and the measurement unit will not be changed.

As an illustrative example, where it is desired to determine the length in centimeters of an object, the scale is placed against the object. If the object extends, for example, from the 10th LED through the 63rd, the operator would follow the procedure outlined above and, after turning on the device, move the cursor to the right until it is adjacent to one of the object endpoints, for example the left endpoint at LED 10. Depressing the RP button will select that position as the reference point. Since the distance is desired in centimeters, the user may depress the [CM] button which moves the cursor one centimeter to the right and displays a 1 in the digital display. Further depressing the [→] button to move the cursor to the right, to the 63rd LED, in this example, the user then observes the distance in centimeters on the numerical display.

Were the user to desire a measurement in some arbitrary scale, as would be the case in reading a map, for example, and assuming the distance is still between the 10th and 63rd LED, the following procedure will be followed: After selecting the reference point, the cursor is moved to the right from the reference point a particular distance. In the case of map reading, the cursor is moved to the right by a distance corresponding to the particular map-scale factor. Thus, where ⅛ inch equals one mile and a map scale is provided, the cursor may be moved to the right by ⅛ inch. At this point, the [CP] button is depressed and the numerical value being measured is entered. In this example, the number 1 would be entered if the desired distance is in miles. Depressing of the [=] button indicates the calibration distance as being 1 unit. Finally, with the scale against the distance being measured, the cursor is displaced to the 63rd LED and the position between the reference point and cursor is displayed numerically in miles. As a further example of the effectiveness of the present invention, in a map-scale having ⅛ inch equivalent to ten miles, the calibration step described above would be modified by entry of the number 10 rather than 1 from the keyboard after depressing the [CP] button. The display would then provide the distance in miles.

Clearly, the scale need not provide a linear measurement. Thus, it is contemplated that scales having optically active components which are themselves non-linearly distributed along the scales may be used. The elements may be logarithmically spaced, for example. Similarly, the elements may be linearly spaced but the measurement phases, under the control of the operating program, may provide displays corresponding to non-linear distances. Thus, for example, the exact distance along a logarithmic chart might be measured using the present electronic rule under a logarithmic subroutine in the operating program. Additionally, it is recognized that the scale need not be linear but may be curved, and may, for example, be provided along a French curve.

As an example of the distance setting procedure, a user may follow Phases 1 and 2 as previously outlined, and may provide a distance either in centimeters, inches, or some arbitrary unit. Thus, once a reference point is determined, the inch or centimeter button may be depressed or an arbitrary unit may be entered by moving the cursor to a calibration distance and entering the numerical value of that distance. The third phase of distance setting, however, requires entry of a number and depressing the [=] button. Thus in the map example previously used, once the scale had been entered as ⅛ inch per ten miles, for example, by displacing the cursor ⅛ inch from the reference point and by depressing the [CP] button followed by entry of the number 10 from the keyboard and by depressing of the [=] button, the user may choose to display a distance representative of 42.5 miles. To do this, the number 42.5 would be entered by the keyboard, the [=] depressed, and the cursor would be moved by the operating program to 42.5 miles (at a scale of ⅛ per ten miles) from the reference point. The user would then have the reference point and cursor separated by the distance equivalent to 42.5 miles at that scale factor.

The software used to support the functions of the electronic rule is the operating program. The program is stored in the two 1 K byte ROM of the MCS 6530 chipes. Basically the program follows the flow of control as shown in FIG. 6.

The primary concept used in monitoring the keyboard and in driving the LED's in scale display is to alternate between reading the keyboard and writing to the display and scale at such a speed that the multiplexing is not discernible.

The operating program consists of a main program and several subroutines. The main program and the major subroutines are described briefly here:

(1) MAIN—This program can be entered as a result of an RST interrupt. Upon entering the program, data variables will be initialized by calling subroutine INIT. SCAN will then be called to execute the scan cycle, i.e. to display the scale LED, to activate the numerical display, and to read the keyboard in a multiplexed manner. When a key in the keyboard is depressed by the user, the program will also branch to a segment of code labeled EXEC, in which the function associated with the key is executed. If no key is depressed, the program will repeat the scan cycle.

(2) INIT, INIT1—This is the initialization routine which sets up the initial values of all variables used in the operating program and moves RP to the left margin of the scale. INIT1 is a different entry point to the subroutine.

(3) SCAN—The routine first selects each of the six seven-segment units in sequence to display a number (with possibly a sign and a unit), then turns on the two LED lights in the scale that correspond to RP and X (cursor), and checks to see if any key in the keyboard is depressed. If no key is depressed, the same control sequence is repeated, that is, displaying a number, turning on RP and X, and checking the keyboard. If a key is found depressed, the control will set up a nonzero value in the accumulator A. Otherwise, A will be cleared to zero. The routine calling SCAN can check the contents of A to determine if a key is depressed.

(4) CONV—This routine uses an internal table to convert a number into bit patterns which correctly select the segments of one seven segment display unit, causing the number to be displayed in the selected unit.

(5) LED—This routine outputs a value to the MCS 6530 unit 44 peripheral pins, causing one of the LED's in the scale to turn on.

(6) KEY, ONEROW—These routines read the keyboard to determine which key is depressed. ONEROW checks only one row of the keys. KEY calls ONEROW repeatedly to check every row.

(7) DIVD—A division routine.

(8) MULT—A multiplication routine.

(9) BCD—This routine converts a binary number to its binary-coded-decimal (BCD) equivalent, which will then be used to drive the seven segment display.

(10) ERROR—This routine blinks all the lights in the seven segment LED's to signal an error. The routine is activated only when illegal operations are detected or when an operation exceeds the precision or margins of the electronic rule.

When the power is initially turned on and the [RS] is depressed by the user, an RST interrupt takes place, which starts the SCAN sequence. The SCAN routine will drive the display and the scale and monitor the keyboard repeatedly. When a depressed key is detected, its function is then executed by EXEC. If an error is detected, ERROR routine will flash the display, which can only be cleared by pushing the [RS] key. Each time the [RS] key is depressed, the electronic rule is initialized and the operating program re-started.

The various subroutines outlined above are shown in flow chart format in Appendix A and B.

APPENDIX A

OPERATING PROGRAM DESCRIPTION

Background

1. When the power is turned on and the [RS] key is depressed, an RST (Reset) interrupt is generated which will start the operating program.
2. Each 6530 chip includes a 1024 byte Read-only Memory (ROM). The operating program is to be stored permanently in the 2048 bytes of ROM in the two 6530 chips (6530-X and 6530-Y).
3. Each 6530 chip includes a 64-byte Random Access Memory (RAM). The total 128 bytes of RAM is to be used for (a) the storage area of the stack to be used by the microprocessor 6502 to save return addresses in subroutine calls and (b) the data areas storing data variables related to the user operations. The data variables related to the item (b) are listed under "Data Constants and Variables."
4. In the flow-chart description of the operating program, "JSR XXX" is used to mean "Jump to subroutine whose name is XXX". This has the affect of saving the return address (RA) in the stack (which is mentioned in 3(a) above). The symbol "RTS" is used to mean "return from subroutine", which is the last instruction in execution in a subroutine and has the effect of directing the control to the address (RA) saved on the top of the stack as well as popping RA off the stack.
5. The entire operating program is described as a collection of routines with each routine represented as a flow-chart.
6. An italic name followed by a colon (:) is used as a label for the nearest statement.
7. DISPLAY, KEYBOARD, and SCALE refer to the three corresponding components of the Electronic Rule.
8. All numbers are in decimal unless specified otherwise. Hexadecimal numbers are indicated with a subscript H.

9. ⊂⊃  Beginning of a routine, name of the routine is enclosed.

| | |
|---|---|
| 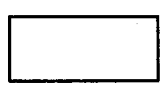 | An action, a program statement |
| 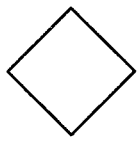 | A decision box |
|  | Branching of control, the subroutine calls and returns. |
|  | A "go to" statement, the destination is indicated inside the circle. |

10. A is the accumulator of the 6502 microprocessor. 18 is the BCD-decimal decoder 60 shown in FIG. 3.

DATA CONSTANTS AND VARIABLES (Note: The size (number of bytes) of the variables or constants is not specified.)

| Variables (located in RAM): | |
|---|---|
| RP | Reference point position |
| XCUR (same as X in the previous discussion) | Cursor position |
| D | Numerical value of the distance to be displayed, represented in BCD form with each segment of 4 bits for a decimal digit. The leftmost byte of D, called sign byte of D stores the sign (− or no display for +) of the distance. All segments are index pointers to TABLE. |
| INCM | An index pointer to TABLE, 11 for i (inch). 12 for c (cm) or 10 for null. |
| UNITSIGN | Sign of UNIT, either 1 for negative or 0 for positive. |
| UNIT | Unit factor, indicating the number of lights for each basic measurement unit selected by the user. |
| CPMODE | A flag indicating whether the user is defining his own measurement unit, either 1 for CP mode or 0 for distance setting. |
| DIGIT | The most recent digit entered by the user. |
| MINUSFLAG | A flag indicating whether the user has depressed the - key, either 1 for depressed or 0 otherwise. |
| DIGIT# | Number of digits entered by the user. |
| .FLAG | A flag indicating whether the user has depressed the .key (decimal point), either 1 for depressed or 0 otherwise. |
| SUM | Integer portion of the number entered by the user. |
| FSUM | Fractional portion of the number entered by the user. |
| DA, DB, Q | Dividend, divisor, and quotient, respectively. |
| MA, MB, P | Multiplicand, multiplier, and product, respectively. |

| Constants (located in ROM): | |
|---|---|
| INFACTOR | Number of lights for one inch. |
| CMFACTOR | Number of lights for one cm. |
| TOTAL | Total number of lights in SCALE. |
| BOUND | Maximum number of digits user can enter (integer or fractional portion). |
| TABLE (entry 0) - | 7-segment code for 0 |
| (entry 1) - | 7-segment code for 1 |
| (entry 2) - | 7-segment code for 2 |
| (entry 3) - | 7-segment code for 3 |
| (entry 4) - | 7-segment code for 4 |
| (entry 5) - | 7-segment code for 5 |
| (entry 6) - | 7-segment code for 6 |
| (entry 7) - | 7-segment code for 7 |
| (entry 8) - | 7-segment code for 8 |
| (entry 9) - | 7-segment code for 9 |
| (entry 10) | 7-segment code for No display (null) |
| (entry 11) | 7-segment code for i |
| (entry 12) | 7-segment code for c |
| (entry 13) | 7-segment code for − |

ABOUT SIGN CONVENTION:

1. By default, if X≧RP then the distance is displayed as positive. If X<RP, then it is negative. X is the cursor position.
2. The user can reverse this convention by hitting the F key. This will cause no change in the positions of RP and X per se. But this will cause the reversal of the signs. Hitting the F key again will return to the default convention. X is the cursor position.
3. The − (minus) key by itself does not reverse the sign convention. It merely causes the minus sign to be displayed.
4. During the distance setting operation, one can depress the minus key, followed by a series of numeric keys to cause the distance to be displayed. The following possibilities may occur in a distance setting operation. X is the cursor position.

| Sign convention | Minus key depressed | Relative positions of RP,X |
|---|---|---|
| default (UNITSIGN=0) | YES | X to the left of RP |
| default (UNITSIGN=0) | NO | X to the right of RP |
| reverse (UNITSIGN=1) | YES | X to the right of RP |
| reverse (UNITSIGN=1) | NO | X to the left of RP |

5. When the user is defining his own measurement unit using CP key, the sign of the unit depends on the relative positions of RP and X, and whether the minus key is depressed or not. The following cases are possible. X is the cursor position.

| Relative positions of X,RP | Minus key depressed | New sign convention |
|---|---|---|
| X to the right of RP | YES | reverse (UNITSIGN=1) |
| X to the right of RP | NO | default |
| X to the left of RP | YES | default |
| X to the left of RP | NO | reverse (UNITSIGN=1) |

EXPLANATION OF MAIN:

There are three JSR SCAN statements in the main program MAIN. If the power is just turned on and no key is depressed, the control stays in the loop of the second JSR SCAN (starting with Repeat). When a key is depressed, the control enters into the third JSR SCAN which double checks if the key is indeed depressed (not noise). If so, go to EXEC. Otherwise, the control returns to the second JSR SCAN. After EXEC, which performs the function associated with the key depressed, the control returns to the loop of the first JSR SCAN (starting with Start) and waits until key is released.
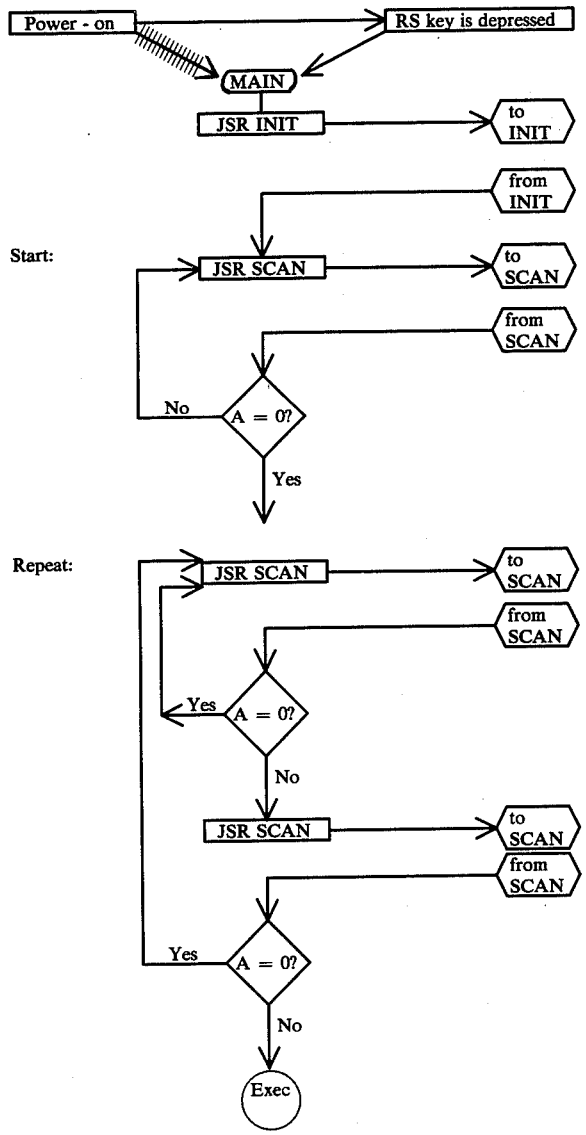
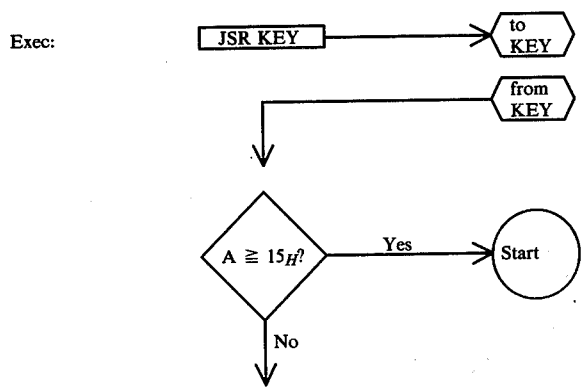

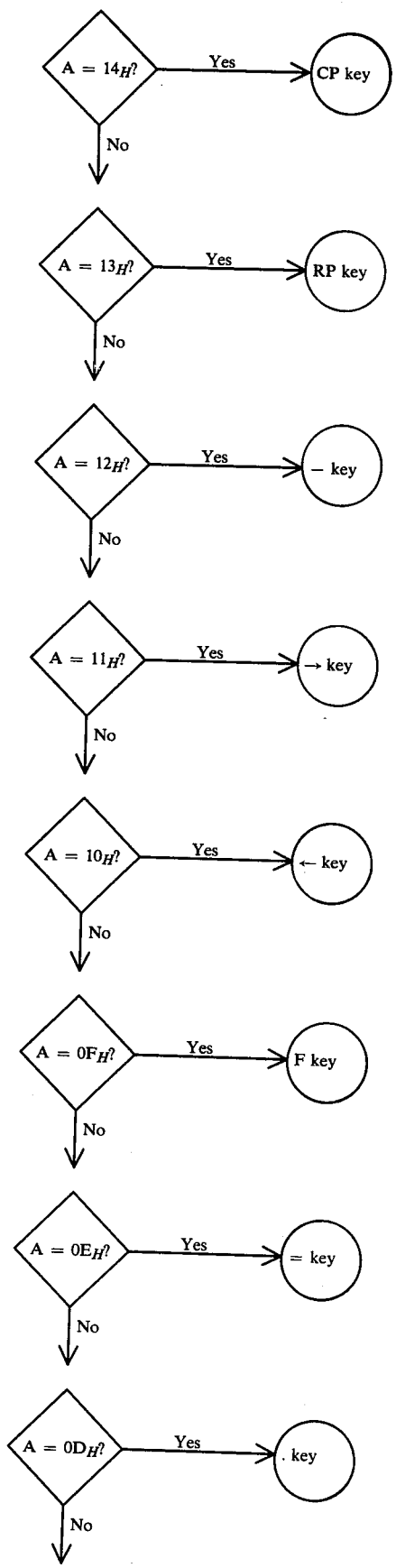

-continued
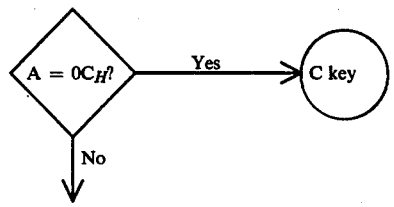
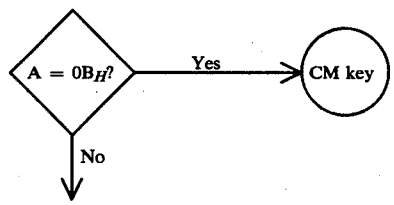
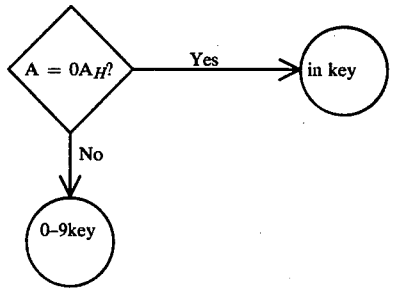
CP Key:
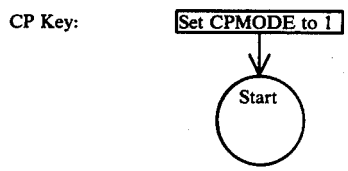
RP Key:
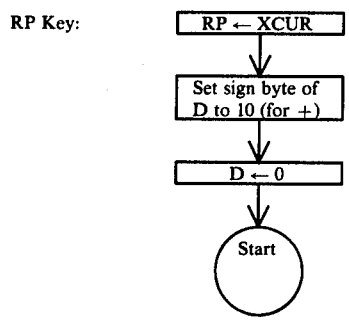

-continued
−Key:
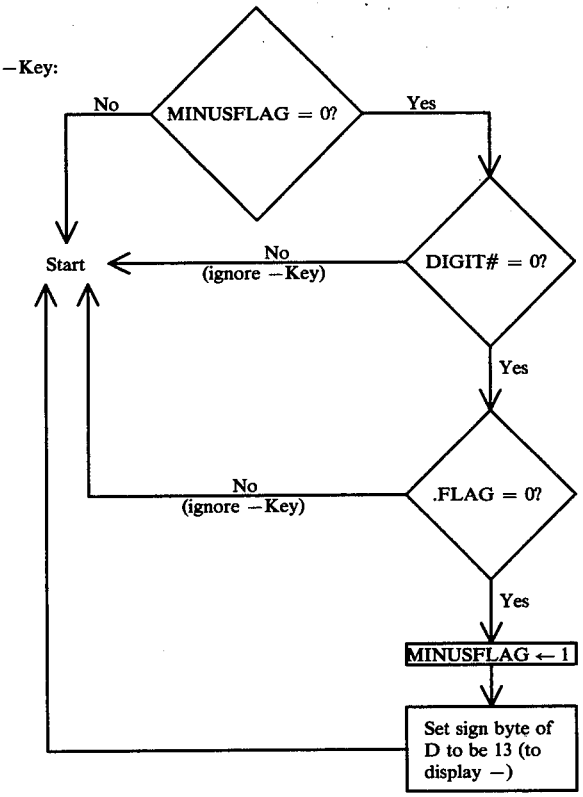
F key:
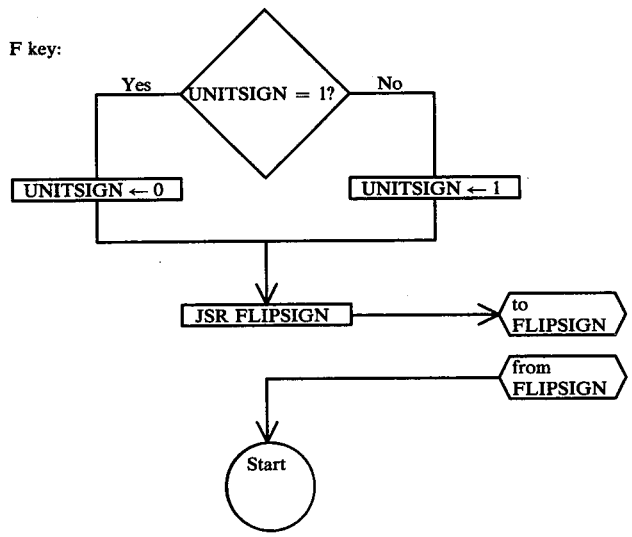
C Key:
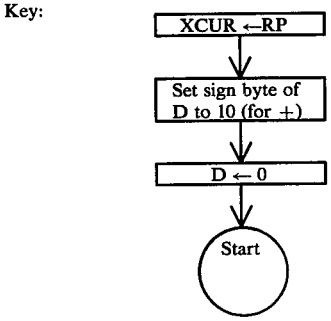

-continued
CM key:
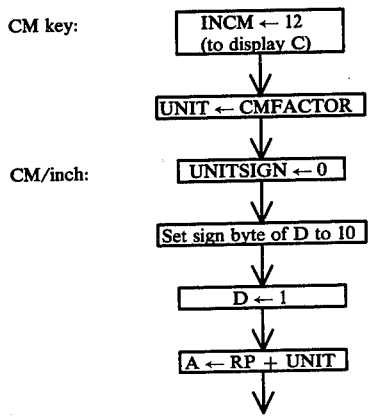
CM/inch:
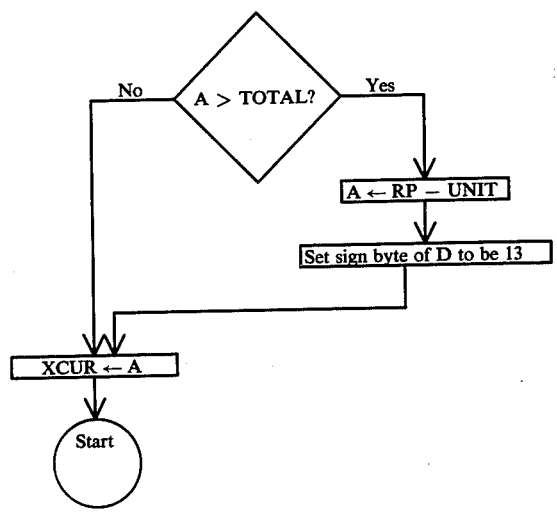
in Key:
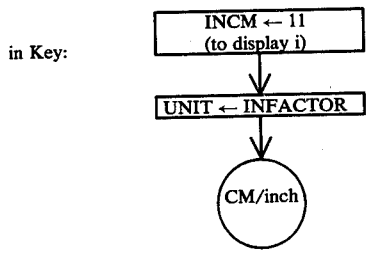
. Key:
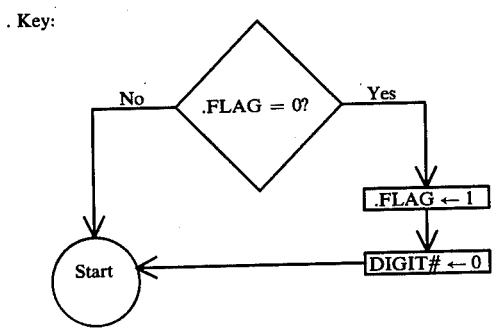

-continued
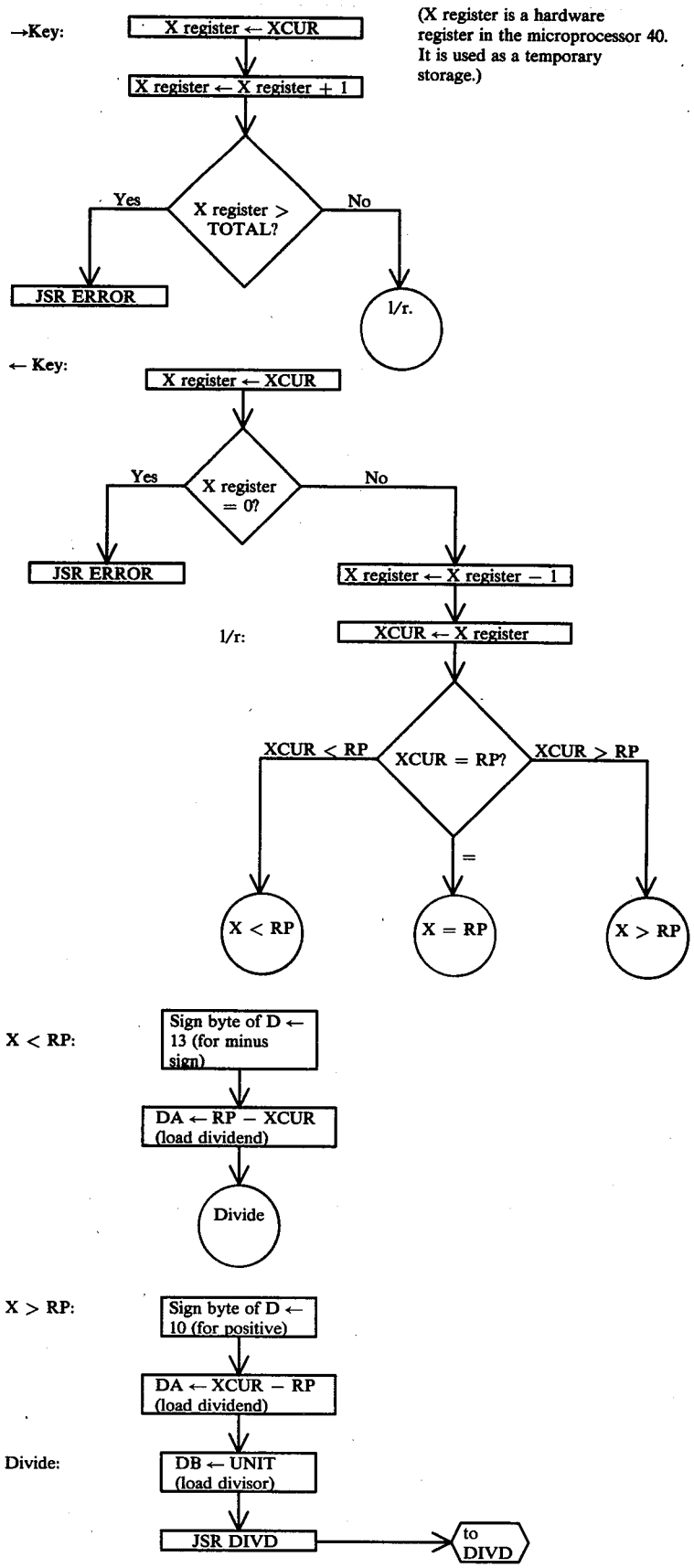

-continued
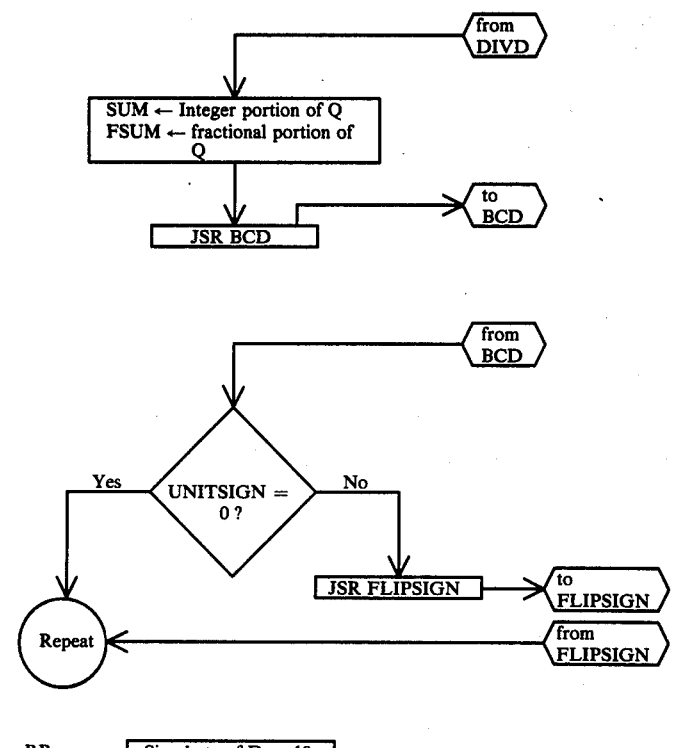
X = RP:
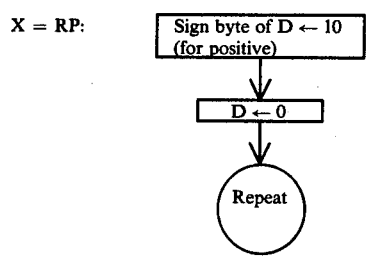
0-9 Key:
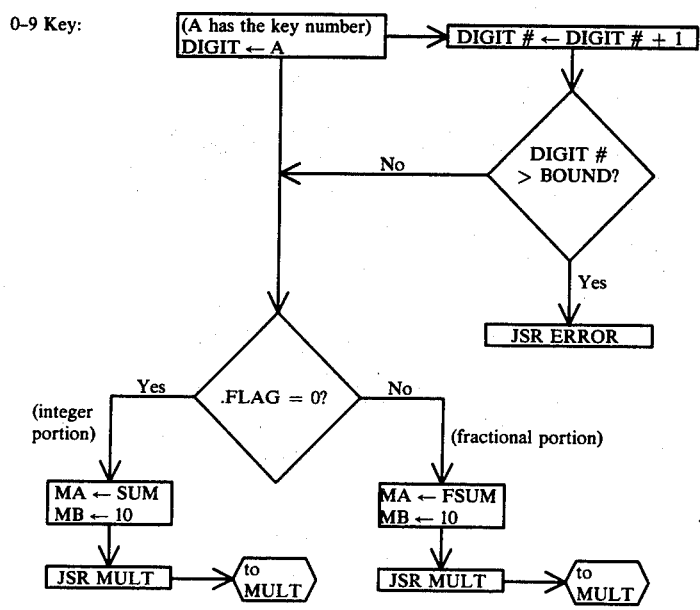

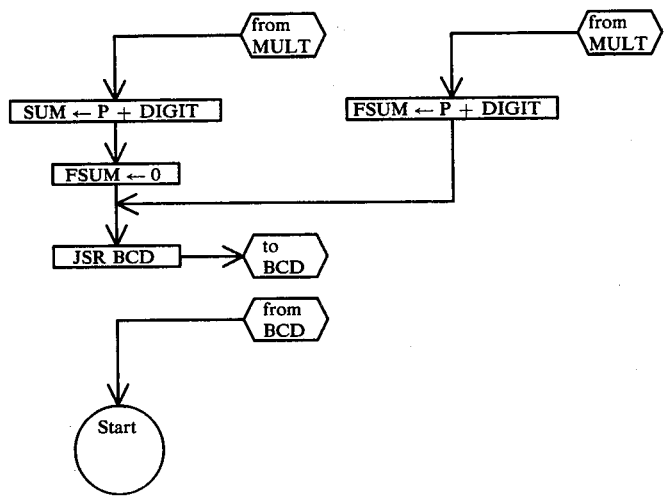
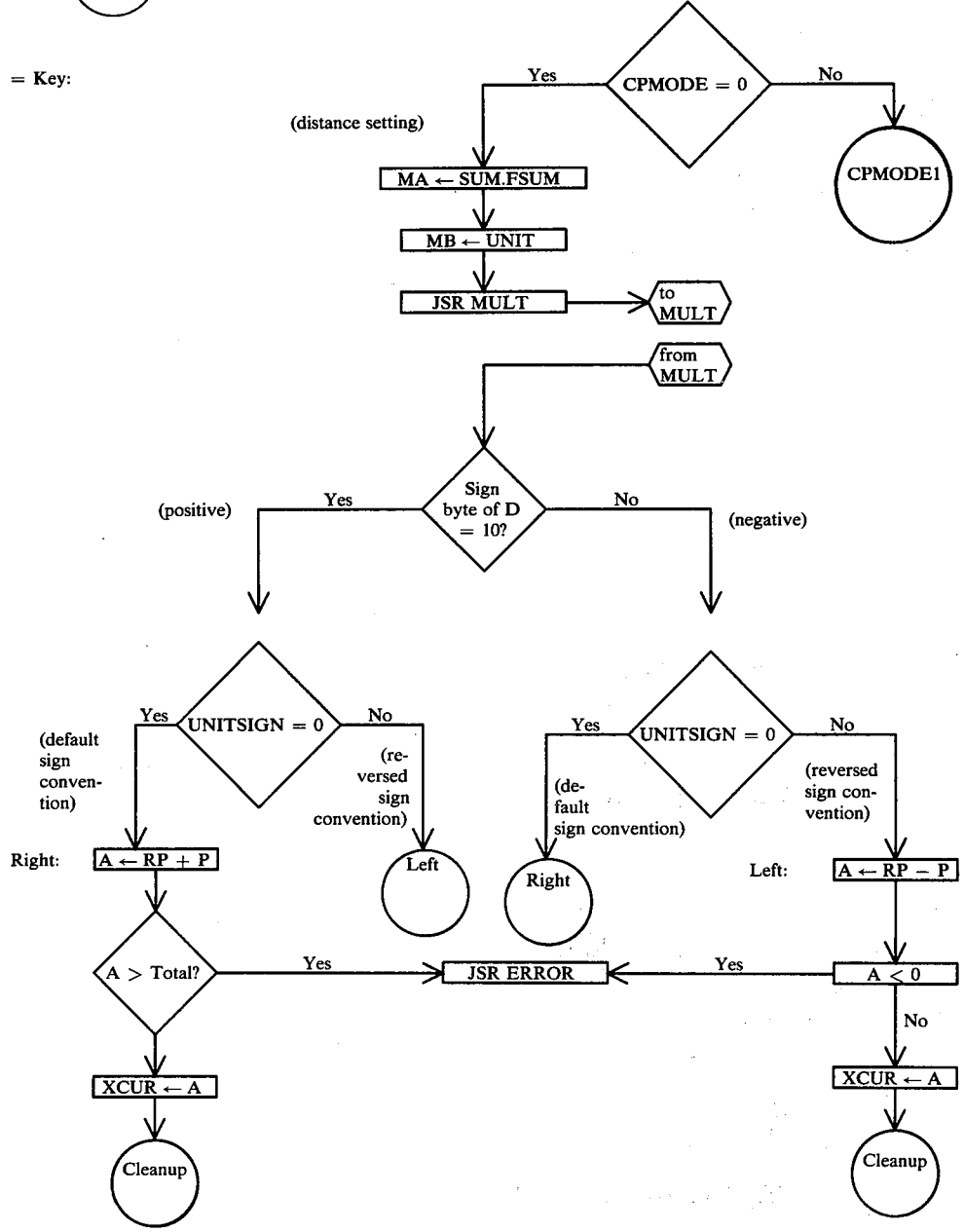

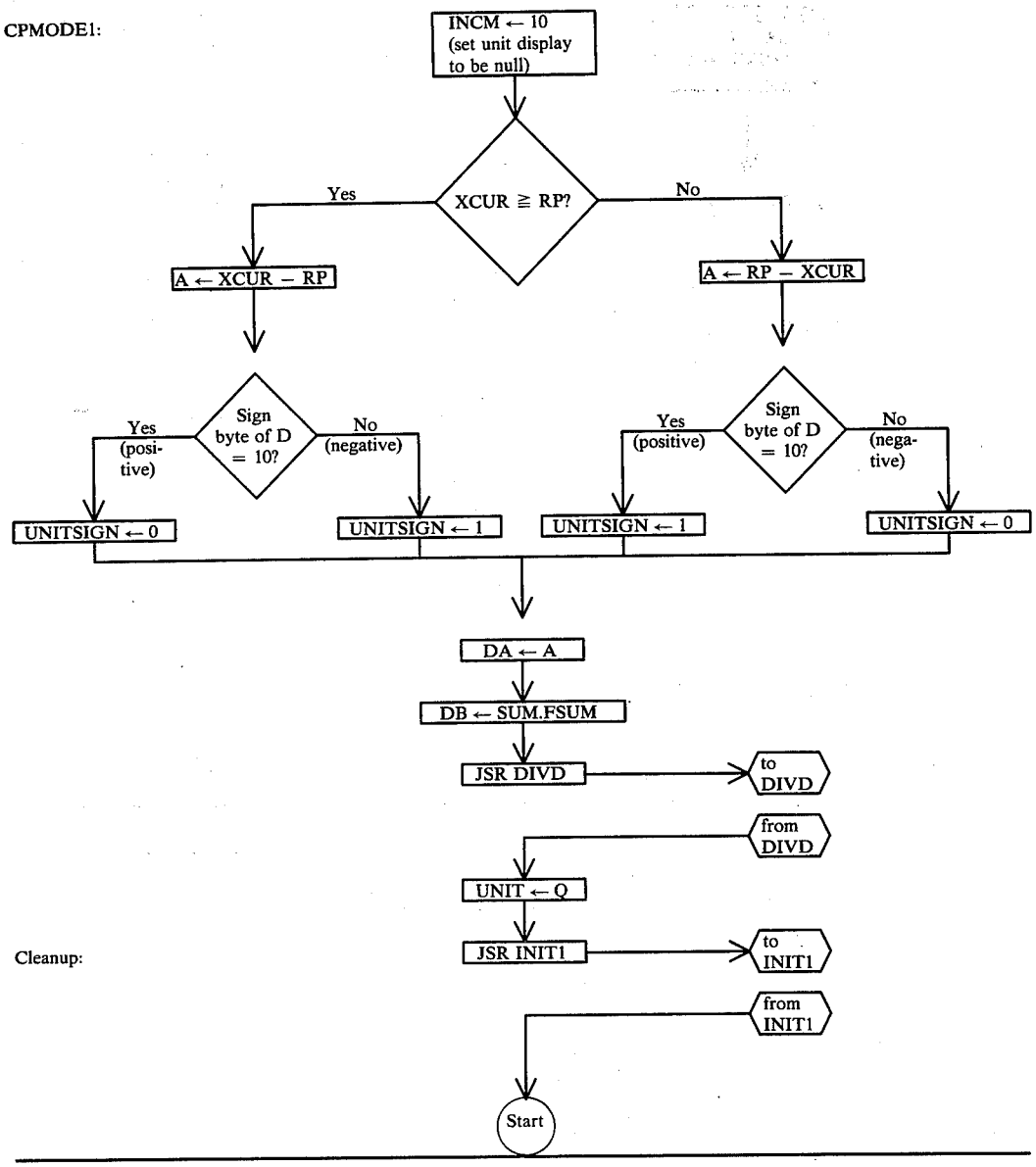

APPENDIX B-continued
```
RP ← 0
XCUR ← 0
UNITSIGN ← 0
D ← 0
     ↓
UNIT ← 1
     ↓
Sign byte of D ← 10
(no display for +)
     ↓
```
INIT1:
```
INCM ← 10
(no display)
     ↓
CPMODE ← 0
MINUSFLAG ← 0
DIGIT# ← 0
.FLAG ← 0
SUM ← 0
FSUM ← 0
     ↓
    RTS
```
SUBROUTINE NAME: SCAN
FUNCTION: To display both DISPLAY and SCALE once then check if any key is depressed. The routine will set A to 0 if and only if it finds that no key is depressed.
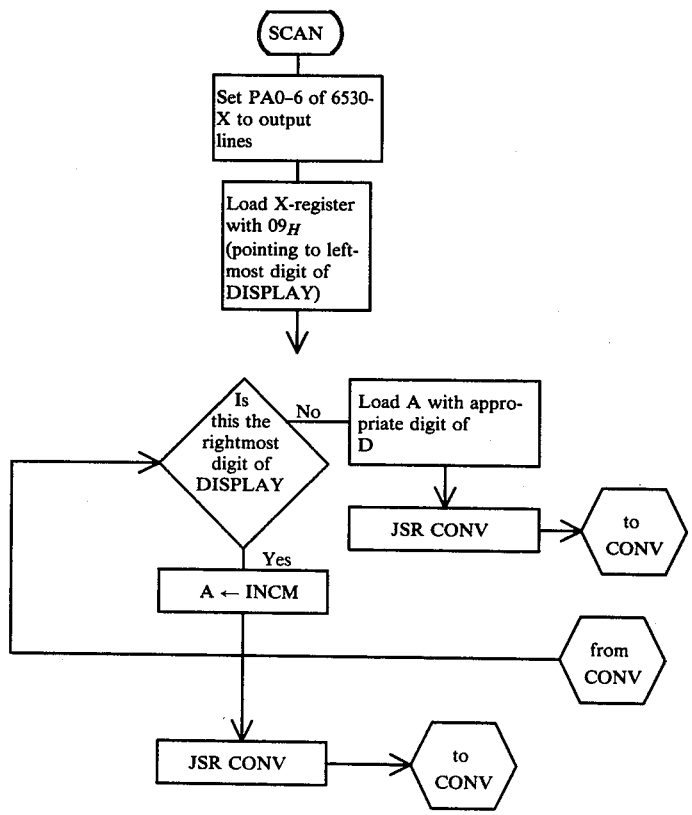

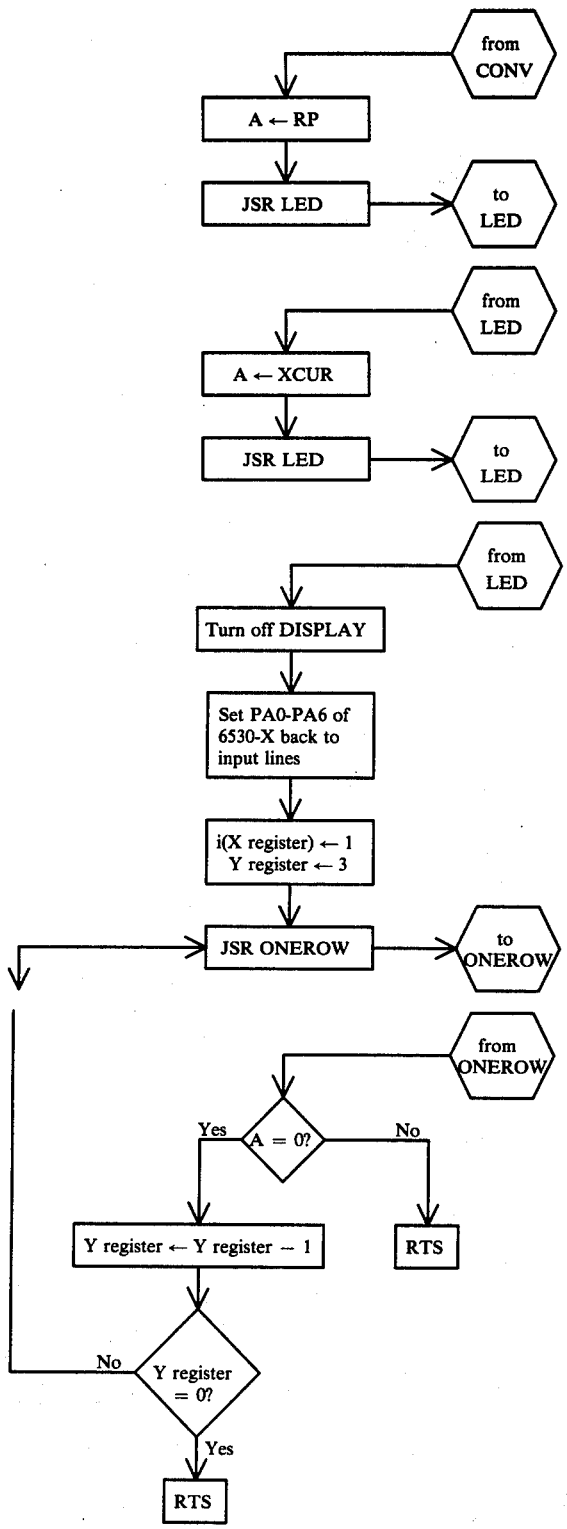

SUBROUTINE NAME: ONEROW
FUNCTION:
This routine checks one row of the KEYBOARD to see if any key is depressed. When no key is found depressed, it will set A to be 0. If a key is found depressed, the bit position corresponding to the key in that row -continued will be set equal to 1. Note that when performing I/O, a depressed key is read as a 0 and nondepressed key is read as a 1. Therefore, a compliment operation is needed. The variable i, which is in X-register, stores the row number to be checked plus 1. The routine will always increment i.

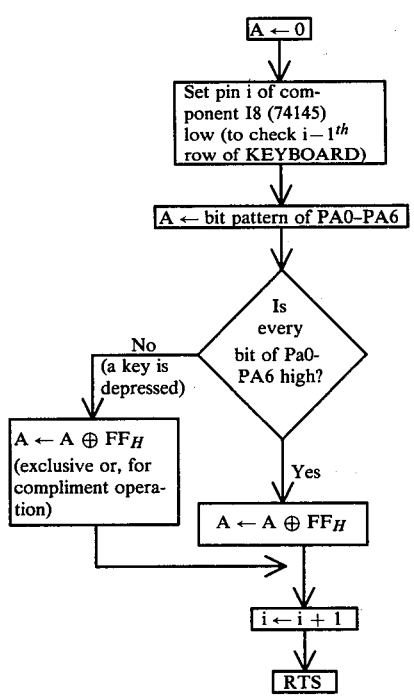

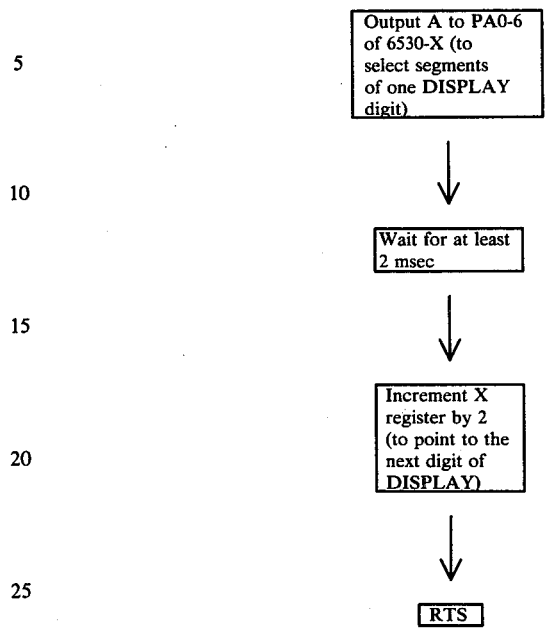

| SUBROUTINE NAME: | CONV |
|---|---|
| FUNCTION: | To convert a decimal digit to a 7-segment code using a conversion table TABLE, also display one digit onto DISPLAY. The accumulator A has the actual digit to be displayed. The X-register has the digit number of DISPLAY. |

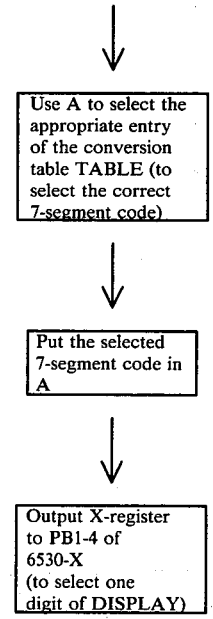

| SUBROUTINE NAME: | LED |
|---|---|
| FUNCTION: | To turn on one light in the SCALE, the accumulator stores the address of the light. |

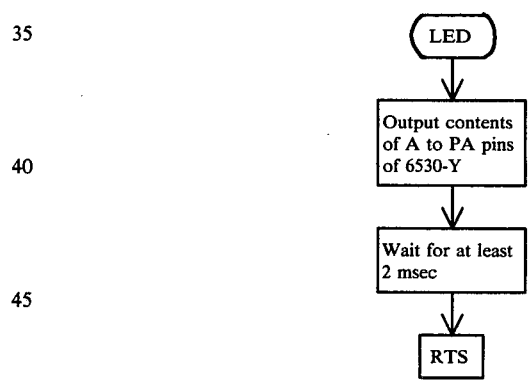

| SUBROUTINE NAME: | KEY | |
|---|---|---|
| FUNCTION: | To find out the number corresponding to the key depressed. | |
| KEY | | KEY NUMBER |
| 0 to 9 | | $00_H$ to $09_H$ |
| IN | | $0A_H$ |
| CM | | $0B_H$ |
| C | | $0C_H$ |
| . | | $0D_H$ |
| = | | $0E_H$ |
| F | | $0F_H$ |
| ← | | $10_H$ |
| → | | $11_H$ |
| − | | $12_H$ |
| RP | | $13_H$ |
| CP | | $14_H$ |
| KEY TO NUMBER CONVERSION TABLE | | |

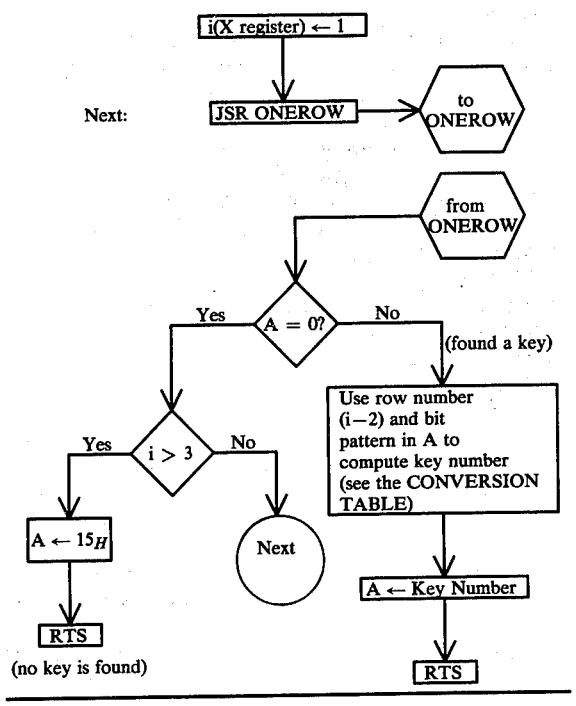

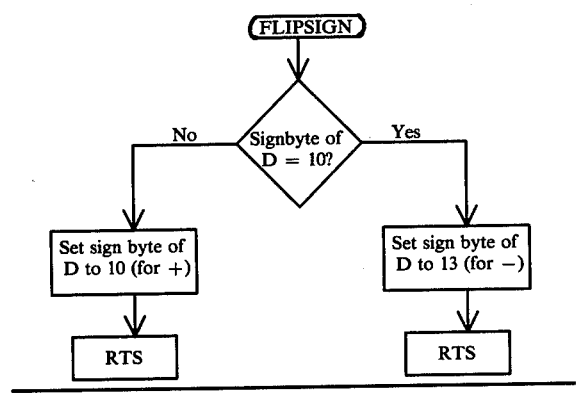

SUBROUTINE NAME: BCD

FUNCTION: To convert a real number whose integer portion is in SUM and fractional portion is FSUM into a binary-coded decimal equivalent so that it is ready for display. The end product is put into D.

DESCRIPTION: (There are standard ways to perform BCD conversion).

SUBROUTINE NAME: DIVD

FUNCTION: To perform binary arithmetic division. The dividend and divisor are taken from DA and DB respectively. The quotient is put into Q. DA, DB, and Q are all real numbers.

DESCRIPTION: (There are standard ways to perform division).

SUBROUTINE NAME: MULT

FUNCTION: To perform binary arithmetic multiplication. The multiplicand and multiplier are taken from MA and MB respectively. The produce is put into P. MA, MB, and P are all real numbers.

DESCRIPTION: (There are standard ways to perform multiplication).

SUBROUTINE NAME: ERROR

FUNCTION: To signal the user that a user error has been made or the capability of the device is exceeded.

DESCRIPTION: This subroutine will not return to its calling program. The routine blinks all the lights in DISPLAY. The user has to depress [RS] key to reset the system and stop the blinking.

Having thus described the objects, features and advantages of the present invention, and having provided a preferred embodiment thereof which is to be used for illustration and not limitation, it is appreciated that many variations of the disclosure will be apparent to those of ordinary skill in the art. Such variations do not depart from the spirit of the invention and are included within the scope of the appended claims.

What is claimed is:

1. Apparatus for distance measurement comprising:
   (a) optically active scale means having a plurality of optically active elements for measuring a distance;
   (b) numerical display means for displaying a numerical representation of the distance measured;
   (c) means for providing operator input; and
   (d) control means responsive to said input means and connected to scale means and display means for activating at least one element of said scale means, and for causing said display means to display a numerical representation of the distance measured along said scale means by said at least one activated element.

2. The apparatus recited in claim 1 wherein said scale means comprises a plurality of light emitting diodes.

3. The apparatus recited in claim 1 wherein said scale means comprises a plurality of liquid crystal elements.

4. The apparatus recited in claim 1 wherein said numerical display comprises a plurality of seven segment display elements.

5. The apparatus as recited in claim 1 wherein said input means comprises a keyboard having a plurality of keys representative of plural numerical values and of plural functions for execution by said control means.

6. The apparatus as recited in claim 5 further comprising multiplexing means for a plurality of said control means functions of activating elements of said scale means, displaying numeric representations of distances on said display means, and responding to said input means.

7. The apparatus as recited in claim 5 wherein said control means activates at least two elements to provide indices for distance measurement.

8. The apparatus as recited in claim 7 wherein said indices provided optically active identification of endpoints of a distance to be measured.

9. The apparatus as recited in claim 7 wherein said control means activates a plurality of adjacent elements to provide identification of a distance along said activated elements.

10. The apparatus as recited in claim 1 wherein said control means comprises digital computer means.

11. The apparatus as recited in claim 1 wherein said input means comprises means for selecting a scale factor for displaying a numerical representation of the measured distance.

12. The apparatus as recited in claim 1 further comprising means for distance setting, whereby an operator enters a selected distance via said input means, and said control means:
(a) activates at least one element of said scale means, thereby displaying said selected distance on said scale means, and
(b) causes said display means to display a numerical representation of said selected distance.

13. Distance setting apparatus for delineating a selected distance comprising:
(a) operator input menas for selecting the distance;
(b) optically active scale means having a plurality of optically active elements for delineating the selected distance;
(c) numerical display means for displaying a numerical representation of the selected distance; and
(d) control means responsive to said input means for activating at least one element of said scale means, and for causing said display means to display a numerical representation of a distance delineated along said scale means using the activated elements thereof;
whereby an operator selects a distance for display by said apparatus, enters the selected distance by said input means, and said control means, responsive to said input means, causes the selected distance to be delineated on said scale and displayed numerically on said display.

14. The apparatus as recited in claim 13 wherein said scale means comprises a plurality of light emitting diodes.

15. The apparatus as recited in claim 13 wherein said scale means comprises a plurality of liquid crystal elements.

16. The apparatus as recited in claim 13 wherein said numerical display comprises a plurality of seven segment display elements.

17. The apparatus as recited in claim 13 wherein said input means comprises a keyboard having a plurality of keys representative of plural numerical values and of plural functions for execution by said control means.

18. The apparatus as recited in claim 17 further comprising multiplexing means for a plurality of said control means functions of activating elements of said scale means, displaying numerical representations of distances on said display means, and responding to said input means.

19. The apparatus as recited in claim 17 wherein said control means activates at least two elements to provide indices for distance delineation.

20. The apparatus as recited in claim 19 wherein said indices provide optically active identification of endpoints of a distance to be delineated.

21. The apparatus as recited in claim 19 wherein said control means activates a plurality of adjacent elements to provide identification of a distance along said activated elements.

22. The apparatus as recited in claim 13 wherein said control means comprises digital computer means.

23. The apparatus as recited in claim 13 further comprising means for selecting a scale factor for displaying a numerical representation of the selected distance.

24. The apparatus as recited in claim 13 further comprising means for distance measurement, whereby an operator causes said control means to delineate a distance on said scale, and said control means further provides a numerical representation of said distance on said display means.

25. A method for mesurement of distances, utilizing an apparatus having an optically active scale comprising a plurality of optically active elements, a numerical display, an input means and a control means, comprising the steps of:
(a) entering instructions to said control means on said input means for generating control signals in response thereto;
(b) activating selected elements of said optically active scale in response to said control means;
(c) computing a distance corresponding to the activated elements of said optically active scale; and
(d) displaying the computed distance on said numerical display.

26. A method as recited in claim 25 further comprising the steps of sensing the instructions entered on said input means, and multiplexing the sensing step with the displaying and the activating steps.

27. A method for distance setting on an apparatus comprising an optically active scale means having optically active elements therein, a display means, an input means and a control means comprising the steps of:
(a) entering a number representative of a selected distance to be shown on said optically active scale means via said input means,
(b) computing the appropriate optically active elements required for delineating the selected distance;
(c) activating said required optically active elements; and
(d) displaying a number on said display means corresponding to the selected distance entered via said input means.

28. A method as recited in claim 27 further comprising the steps of sensing the selected distance entered via said input means, and multiplexing said sensing, activating and displaying steps.

* * * * *